(12) United States Patent
Goldman

(10) Patent No.: US 11,554,058 B2
(45) Date of Patent: Jan. 17, 2023

(54) MOBILITY SCOOTER WITH INTEGRATED SABBATH MODE REMOTE CONTROL

(71) Applicant: Moving Life Ltd., Kibbutz Nezer Sereni (IL)

(72) Inventor: Yizhaq Goldman, Holon (IL)

(73) Assignee: Moving Life Ltd., Kibbutz Nezer Sereni (IL)

( * ) Notice: Subject to any disclaimer, the term of this patent is extended or adjusted under 35 U.S.C. 154(b) by 200 days.

(21) Appl. No.: 17/176,207

(22) Filed: Feb. 16, 2021

(65) Prior Publication Data

US 2022/0241122 A1 Aug. 4, 2022

(30) Foreign Application Priority Data

Feb. 4, 2021 (IL) .......................................... 280667

(51) Int. Cl.
*A61G 5/04* (2013.01)
*A61G 5/10* (2006.01)
*H02J 7/00* (2006.01)

(52) U.S. Cl.
CPC ............... *A61G 5/041* (2013.01); *A61G 5/10* (2013.01); *A61G 2203/12* (2013.01); *H02J 7/0042* (2013.01)

(58) Field of Classification Search
CPC . A61G 5/041; A61G 5/10; A61G 5/04; A61G 2203/12; A61G 2203/30; H02J 7/0042; B62J 45/00; G05D 1/0011
See application file for complete search history.

(56) References Cited

U.S. PATENT DOCUMENTS

| 3,980,980 | A | 9/1976 | Zioni et al. |
| 4,031,035 | A | 6/1977 | Reader |
| 5,808,278 | A | 9/1998 | Moon et al. |
| 9,265,675 | B2 | 2/2016 | Ransenberg et al. |
| 9,669,868 | B2 * | 6/2017 | Fukuoka ................. G08C 17/02 |

(Continued)

FOREIGN PATENT DOCUMENTS

WO  WO 2017/217936  12/2017

OTHER PUBLICATIONS

Amigo "Amigo Mobility Shabbat", Amigo Mobility International, Inc., 1 P., Jun. 11, 2019.

(Continued)

*Primary Examiner* — Steve Clemmons

(57) ABSTRACT

A mobility scooter control system includes a remote control console having a wireless transmitter and switches. A status detection circuit is integrated with the switches. The status detection circuit emits a pulse on a regular cycle. After the pulse passes the respective switch following a change in state of the switch, a wireless transmission is sent. A controller is electronically connected to a motor. The control system has a regular operation mode in which direction of movement and speed limit functions are responsive to instructions inputted to the controller, and, in the absence of user instruction, the controller does not instruct movement of the motor. The control system has a Sabbath operation mode in which the direction of movement and speed limit functions are responsive only to signals from the wireless transmitter, and, in the absence of user instruction, the controller instructs the motor to continuously cycle backward and forward.

16 Claims, 4 Drawing Sheets

(56) References Cited

U.S. PATENT DOCUMENTS

| | | | | | |
|---|---|---|---|---|---|
| 2014/0364272 | A1* | 12/2014 | Shapira | ............... | B66B 11/0484 477/3 |
| 2022/0147076 | A1* | 5/2022 | Nagar | ................. | G05D 16/208 |
| 2022/0162038 | A1* | 5/2022 | Davidian | ................. | B66B 9/04 |

OTHER PUBLICATIONS

Amigo "Healthcare: Mobility Starts Here", Amigo Mobility International, Inc., Product Description, 12 P., Aug. 13, 2019.

GramaChip "Another Shabbos Scooter Developed bv Grama Chip Technologies LLC, Location: Toronto, ON, Canada", GramaChip Technologies LLC, Blog, 4 P., Aug. 13, 2017.

GramaChip "Shabbos Electgric Scooter With a Custom Shabbos Attendant Remote Controller Developed by GramaChip Technologies LLC, Approved by the Star-K for This Specific Situation, Type: Drive Medical, Location: Suffern, NY, USA", GramaChip Technologies LLC, Blog, 7 P., Sep. 26, 2017.

Kosher Certified Shabbos Mobility "What is a Mobility Scooter?", Gneral Scoter Information, Kosher Certified Shabbos Mobility, 4 P., Dec. 2020.

Meir "The Electric Wheelchair on Shabbat", The Zomet Institute, Halacha & Technology, 8 P., May 30, 2016.

Rozen "Electric Scooter", The Zomet Institute. Products & Solutions, 3 P., May 30, 2016.

Rozen "The Freedom of Mobility", The Zomet Institute, Halacha & Technology, 4 P., May 30, 2016.

Rozen "The Freedom of Mobility. Halachic Adaption of Electric Mobility Devices for Use on Shabbat", New Point, National Council of Young Israel, 4 P., Apr. 2005.

Zomet Institute "Adjustable Sickbed", The Zomet Institute, Products & Solutions, 2 P., May 30, 2016.

Zomet Institute "Electric Scooter—Operating Instructions", The Zomet Institute, Halacha & Technology, 3 P., May 30, 2016.

Office Action and Search Report dated Oct. 17, 2021 From the Israel Patent Office Re. Application No. 280667. (9 Pages).

YouTube "Go1: Scooter With Shabbat Command", YouTube, 4 P., Apr. 10, 2017.

* cited by examiner

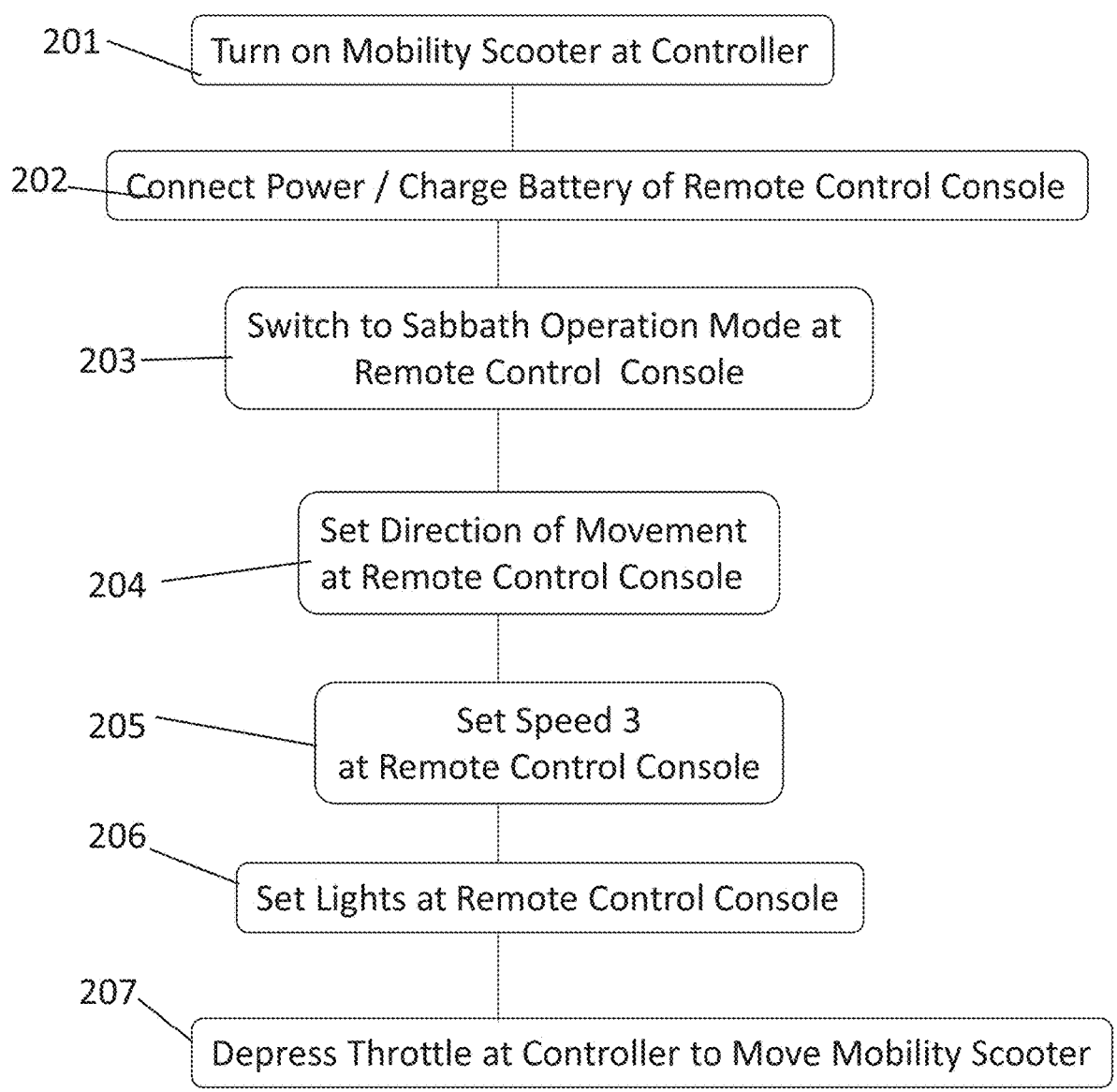

MOBILITY SCOOTER WITH INTEGRATED SABBATH MODE REMOTE CONTROL

RELATED APPLICATION(S)

This application claims the benefit of priority of Israel Patent Application No. 280667 filed on Feb. 4, 2021, the contents of which are all incorporated by reference as if fully set forth herein in their entirety.

FIELD AND BACKGROUND OF THE INVENTION

The present invention, in some embodiments, relates to a control system for a mobility scooter, and more specifically, but not exclusively, to a control system having a remote control console for delivering commands to a controller of a mobility scooter, and having a regular operation mode and a Sabbath operation mode.

The popularity of mobility scooters has dramatically increased over the last several decades. This increase in the popularity of mobility scooters is due to many factors, including the advent of new structural material as well as new manufacturing techniques. In addition, recent models of mobility scooters are able to fold easily and compactly, to enable ease of transportation and storage. An example of such a recent model is the ATTO™ mobility scooter sold by Moving Life, Ltd., the assignee of the present application. Embodiments of such foldable mobility scooters are disclosed in U.S. Pat. No. 9,265,675, the contents of which are incorporated by reference as if fully set forth herein.

Sabbath observant users of mobility scooters are unable to use the mobility scooters in their regular modes of operation. This is because regular operation of buttons in a control console causes opening and closing of electrical switches, which is prohibited on the Sabbath. In addition, in regular operation of a mobility scooter, when the scooter is at rest, no current flows to the motor, so that every time the scooter begins moving, a current is generated. The generation of a current is also prohibited on the Sabbath.

Existing solutions for use of mobility scooters on the Sabbath involve hard-wiring a Sabbath control console to the integrated control console of the mobility scooter. On the Sabbath, control of the scooter is transferred from the integrated control console to the Sabbath control console. The Sabbath control console contains an alternate set of control buttons for the mobility scooter. Each of these alternate buttons is connected to a switch that is part of a status change detection circuit. The status detection circuit is commonly described as a "gramma," meaning indirect, circuit, because it utilizes the leniency of indirect causation under Jewish law. In a status detection circuit, a controller periodically sends out a very short pulse, for example every 3-10 seconds, on a path that includes a switch. During each cycle, the controller detects whether the switch has changed from its previous status. Upon detection of a change in status, the controller issues an instruction. As a result, operating the switch results in an instruction being issued only after the signal passes the switch and detects the change in status.

To address the challenge of generation of current when operating the motor, existing solutions require that, on the Sabbath, the motor is always drawing power from the battery. Therefore, when a user instructs movement of the scooter, the resulting delivery of power involves not a generation of a flow of current to the motor, which violates the Sabbath, but merely an increase in the flow of current to the motor, which does not violate the Sabbath. In practice, this means that the motor is always slowly moving forward. To prevent the mobility scooter from unwanted movement, a user must hold it in place, either by applying his or her own weight, or by applying another restraining mechanism, such as a hand brake.

SUMMARY OF THE INVENTION

Existing Sabbath mode solutions for mobility scooters pose various challenges, both from the perspective of utility and from the perspective of user experience. With regard to utility, a Sabbath control console such as those described above is installed on a mobility scooter only after the mobility scooter is complete, and is hard-wired to the integrated control console of the mobility scooter. It is necessary to permanently affix the Sabbath control console relatively near the integrated controls, and in a location that was not designed to house a control console. Such control consoles are unsightly and bulky. Furthermore, the installation process for these consoles may be expensive and cumbersome. In addition, if the mobility scooter is foldable, the Sabbath control console may be installed in a location that inhibits proper folding of the mobility scooter.

In addition, as discussed above, when existing mobility scooters are operated in Sabbath mode, the motor is constantly moving in a forward direction. This is because the Sabbath mode controls are integrated to the standard controls via hard-wiring, and the standard controls are capable only of delivering power to their motors in a forward or in a backwards direction. This constant forward movement is uncomfortable for many users, who are required to apply their weight to counterbalance the forward movement when they do not wish to move. Moreover, in general, the functionality of the Sabbath mode controls is limited by the control system of the controller, and may not be able to provide a Sabbath mode functionality for all desired systems. For example, in certain existing Sabbath mode control systems, it is not possible to operate the light of the mobility scooter with the Sabbath mode controller.

It is an object of the present disclosure to provide a control system for a mobility scooter that is capable of switching between regular operation mode and Sabbath operation mode, without requiring a hard-wired Sabbath control console. It is another object of the present disclosure to provide a control system for a mobility scooter with an enhanced user experience, particularly in the Sabbath mode. It is another object of the present disclosure to provide an integrated control system for a mobility scooter in which all essential functions of the mobility scooter are capable of being exercised in the Sabbath mode.

According to a first implementation, a mobility scooter control system includes a remote control console. The remote control console includes a wireless transmitter and a plurality of switches. At least one status detection circuit is integrated with each of the switches. The at least one status detection circuit is configured to emit a pulse on a continuous, regular cycle. Processing circuitry is configured to detect a change in state of each switch, such that, after the pulse passes the respective switch following a change in state of the switch, a wireless transmission is sent. At least one controller is electronically connected to at least one motor of a mobility scooter. The control system has a regular operation mode in which a direction of movement function and a speed limit function are responsive to instructions inputted directly to the at least one controller, and, in the absence of instruction by a user, the at least one controller does not instruct movement of the at least one motor. The control system has a Sabbath operation mode in which the direction of movement function and the speed limit function are responsive only to signals from the wireless transmitter, and, in the absence of instruction by the user, the at least one controller instructs the at least one motor to continuously cycle backward and forward.

Advantageously, the remote control console delivers all commands through the status detection circuit, which relies on the principle of indirect causation and does not violate the Sabbath. In addition, the remote control console may be easily removed. This movability forestalls any potential complications in folding and transport that are present with hard-wired consoles, and allows for safe storage of the remote control console when the mobility scooter is transported or shipped. Moreover, the control system includes continuous forward and backward cycling in Sabbath operation mode. This cycling is more comfortable to the typical user than continuous forward movement, because the user is not required to exert any effort in order to prevent the mobility scooter from changing position. The inclusion of forward and backward cycling is especially feasible in a system in which the control system for the mobility scooter is initially designed for switching between regular and Sabbath operation mode.

In another implementation according to the first aspect, in the Sabbath operation mode, the at least one controller instructs the at least one motor to cycle between forward and backward movement following each visually perceptible movement of wheels of the mobility scooter. Advantageously, the cyclical movement of the mobility scooter is in short movements that are barely perceptible and do not cause any adverse side effects on the user's comfort.

In another implementation according to the first aspect, the controller comprises a throttle. Upon depression of the throttle in the Sabbath operation mode, the at least one controller causes delivery of increased or decreased power to the at least one motor so as to propel the mobility scooter, said propelling in a direction of movement determined with the direction of movement function and at a maximum speed determined by the speed limit function. Advantageously, because the throttle is integrated with the at least one motor which has a constant delivery of power while in Sabbath mode, depressing the throttle causes only a change in the current delivered to the motor, which is permitted on the Sabbath, as opposed to causing creation of a current. Furthermore, the other control functions are set with the remote controller. As a result, all control instructions are delivered to the motor in a manner that is consistent with the Sabbath.

In another implementation according to the first aspect, the mobility scooter further comprises a power coupling port, and the remote control console further comprises a power cable configured to connect to the power coupling port and thereby deliver power to the remote control console. In addition or in the alternative, the remote control console further comprises a chargeable battery. Advantageously, the power cable and/or battery ensures that the remote control console has sufficient power for carrying out its functions.

In another implementation according to the first aspect, the system includes a strap for releasably attaching the remote control console to the mobility scooter. Advantageously, when the strap is affixed to the mobility scooter, the strap retains the remote control console in place for easy use. When the user wishes to store the remote control console, for example when collapsing the mobility scooter, he or she may easily remove the remote control console.

In another implementation according to the first aspect, the plurality of switches include an operation mode switch for switching between the regular operation mode and the Sabbath operation mode, a switch for increasing and decreasing the speed limit and a switch for changing direction of movement between forwards and backwards. Advantageously, each of these commands is communicated to the controller using the status detection circuit, thereby ensuring that they are delivered only through indirect action.

In another implementation according to the first aspect, the mobility scooter further comprises at least one light, and the plurality of switches comprises a power switch for the at least one light. Advantageously, the light may also be operated consistent with requirements of the Sabbath, enhancing user safety.

According to a second aspect, a method of operating a mobility scooter control system is disclosed. The control system comprises a remote control console comprising a wireless transmitter and a plurality of switches, and at least one status detection circuit integrate with each of the switches. The at least one status detection circuit is configured to emit a pulse on a continuous, regular cycle. Processing circuitry is configured to detect a change in state of each switch, such that, after the pulse passes the respective switch following a change in state of the switch, a wireless transmission is sent. At least one controller is electronically connected to at least one motor of a mobility scooter. The control system has a regular operation mode in which a direction of movement function and a speed limit function are responsive to instructions inputted directly to the at least one controller, and, in the absence of instruction by a user, the at least one controller does not instruct movement of the at least one motor. The control system has a Sabbath operation mode in which the direction of movement function and the speed limit function are responsive only to signals from the wireless transmitter, and, in the absence of instruction by the user, the at least one controller instructs the at least one motor to continuously cycle forward and backward. The method comprises switching the mobility scooter control system between the regular operation mode and the Sabbath operation mode.

Advantageously, the remote control console delivers all commands through the status detection circuit, which relies on the principle of indirect causation and does not violate the Sabbath. In addition, the remote control console may be easily removed. This movability forestalls any potential complications in folding and transport that are present with hard-wired consoles, and allows for safe storage of the remote control console when the mobility scooter is transported or shipped. Moreover, the control system includes continuous forward and backward cycling in Sabbath operation mode. This cycling is more comfortable to the typical user than continuous forward movement, because the user is not required to exert any effort in order to prevent the mobility scooter from changing position. The inclusion of forward and backward cycling is especially feasible in a system in which the control system for the mobility scooter is initially designed for switching between regular and Sabbath operation mode.

In another implementation according to the second aspect, in the Sabbath operation mode, the at least one controller instructs the at least one motor to cycle between forward and backward movement following each visually perceptible movement of wheels of the mobility scooter. Advantageously, the cyclical movement of the mobility scooter is in short movements that are barely perceptible and do not cause any adverse side effects on the user's comfort.

In another implementation according to the second aspect, the at least one controller further comprises a throttle. The method further comprises depressing the throttle when the mobility scooter is in the Sabbath operation mode, wherein, upon said depression of the throttle, the at least one controller causes delivery of increased or decreased power to the at least one motor so as to propel the mobility scooter, said propelling in a direction of movement determined with the direction of movement function and at a maximum speed determined by the speed limit function. Advantageously, because the throttle is integrated with the motor which has a constant delivery of power while in Sabbath mode, depressing the throttle causes only a change in the current delivered to the at least one motor, which is permitted on the Sabbath, as opposed to causing creation of a current. Furthermore, the other control functions are set with the remote controller. As a result, all control instructions are delivered to the at least one motor in a manner that is consistent with the Sabbath.

In another implementation according to the second aspect, the method further comprises, prior to the switching step, connecting a power cable of the remote control console to a power coupling port in the mobility scooter, and/or charging a battery of the remote control console. Advantageously, the power cable and/or battery ensures that the remote control console has sufficient power for carrying out its functions.

In another implementation according to the second aspect, the method further comprises strapping the remote control console to the mobility scooter. Advantageously, when the strap is affixed to the mobility scooter, the strap retains the remote control console in place for easy use. When the user wishes to store the remote control console, for example when collapsing the mobility scooter, he or she may easily unstrap the strap to remove the remote control console.

In another implementation according to the second aspect, one of the plurality of switches is an operation mode switch, and the switching step comprises depressing the operation mode switch. Switching the control system from the regular operation mode to the Sabbath operation mode is performed from the remote control console. This allows the switch to Sabbath mode to be performed on the Sabbath itself, obviates any need to include a mode operation switch on the controller, and ensures that the Sabbath operation mode is engaged only when the remote control console is present.

In another implementation according to the second aspect, the plurality of switches includes a switch for increasing and decreasing the speed limit, and a switch for changing direction of movement between forwards and backwards. The method further comprises, when the mobility scooter is in the Sabbath operation mode, setting the speed limit with the switch for increasing and decreasing the speed limit, and setting the direction of movement with the switch for changing direction of movement. Advantageously, each of these commands is communicated to the controller using the status detection circuit, thereby ensuring that they are delivered only through indirect action.

In another implementation according to the second aspect, the mobility scooter comprises at least one light, the plurality of switches comprises a power switch for the at least one light, and the method comprises at least one of turning on and turning off the light while in Sabbath operation mode by depressing the power switch. Advantageously, the light is operated consistent with the requirements of the Sabbath, enhancing user safety.

According to a third aspect, a remote control console for a mobility scooter includes a wireless transmitter and a plurality of switches, and at least one status detection circuit integrated with each of the switches. The at least one status detection circuit is configured to emit a pulse on a continuous, regular cycle. Processing circuitry configured to detect a change in state of each switch, such that, after the pulse passes the respective switch following a change in state of the switch, a wireless transmission is sent. Different signals from the wireless transmitter are configured to control a direction of movement function of a motor of a mobility scooter, a speed limit function of the motor, and whether the mobility scooter implements commands from the remote control console. The remote control console is thus able to transmit these commands through indirect action, which does not violate the Sabbath.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a flow chart depicting a method of operating the mobility scooter in Sabbath operation mode, according to embodiments of the present disclosure.

DESCRIPTION OF SPECIFIC EMBODIMENTS OF THE INVENTION

Figure 1:
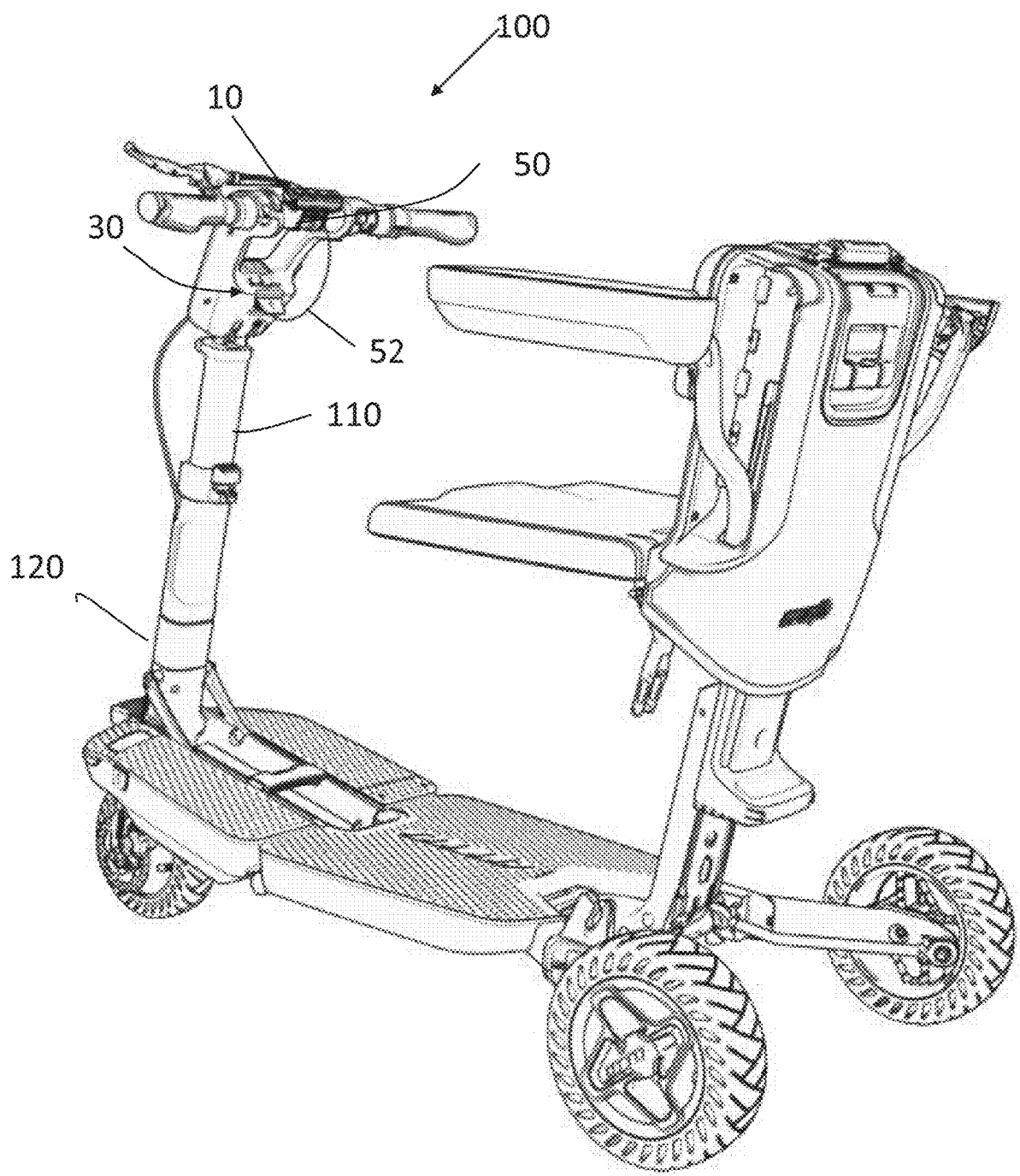
FIG. 1 is a perspective view of a mobility scooter having a remote control console attached thereto, according to embodiments of the present disclosure.

The present invention, in some embodiments, relates to a control system for a mobility scooter, and more specifically, but not exclusively, to a control system having a remote control console for delivering commands to a controller of a mobility scooter, and having a regular operation mode and a Sabbath operation mode.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring to FIG. 1, mobility scooter 100 includes controller 30 and remote control console 10. Controller 30 is attached to a tiller of the mobility scooter 100, which is mounted on steering column 110. Controller 30 is electronically connected to motor 120, for example, through a wired connection. The illustrated embodiment depicts one controller 30 and a single motor 120 for delivering power at the front wheel. In alternative embodiments, there is more than one motor 120. In one exemplary alternative embodiment, there are two motors, each configured to deliver power to the rear wheel. In embodiments with more than one motor, the controller 30 may be comprised of multiple internal control units, each control unit separately controlling delivery of power to a respective motor. In such embodiments, each user input to the controller 30 is simultaneously delivered to each internal control unit.

Remote control console 10 includes a wireless transmitter (not shown in FIG.1), which communicates with a corresponding wireless receiver in controller 30 (not shown in FIG. 1). The remote transmission may operate using any suitable protocol, for example, radiofrequency (RF), infrared, Bluetooth, or Bluetooth Low Energy.

Except in respects detailed herein, mobility scooter 100 and motor 120 may be constructed and operated in the manner of mobility scooters and motors known in the art. In particular, mobility scooter 100 may be a foldable mobility scooter such as the embodiments disclosed in U.S. Pat. No. 9,265,675, the contents of which are incorporated by reference as if fully set forth herein.

In the illustrated embodiments, a strap 50 is used to attach remote control console 10 to the tiller of the mobility scooter 100. Strap 50 is made of any suitable material, for example, rubber or plastic, and may be secured with any suitable fastener, for example, a buckle, complementary tabs and apertures, or complementary hooks and loops. Obviously, because remote control console 10 communicates with the controller 30 wirelessly, it may be used from any location within range of the wireless transmitter and receiver. Nevertheless, it is advantageous to secure the remote control console 10 to the mobility scooter 100 when the remote control console 10 is in use, to ensure that the remote control console 10 is not lost, and to enable easy access to the buttons of the remote control console 10 for a user sitting on the seat of the mobility scooter 100. In addition, securing the remote control console 10 to the mobility scooter 100 enables delivery of power from the mobility scooter 100 to the remote control console 10 via power cord 52. Conversely, when the remote control console 10 is not being used, it may be removed from the tiller. For example, a user may wish to remove remote control console 10 when the mobility scooter 100 is folded for storage and transport, to ensure that remote control console 10 would not be damaged.

Figure 2:
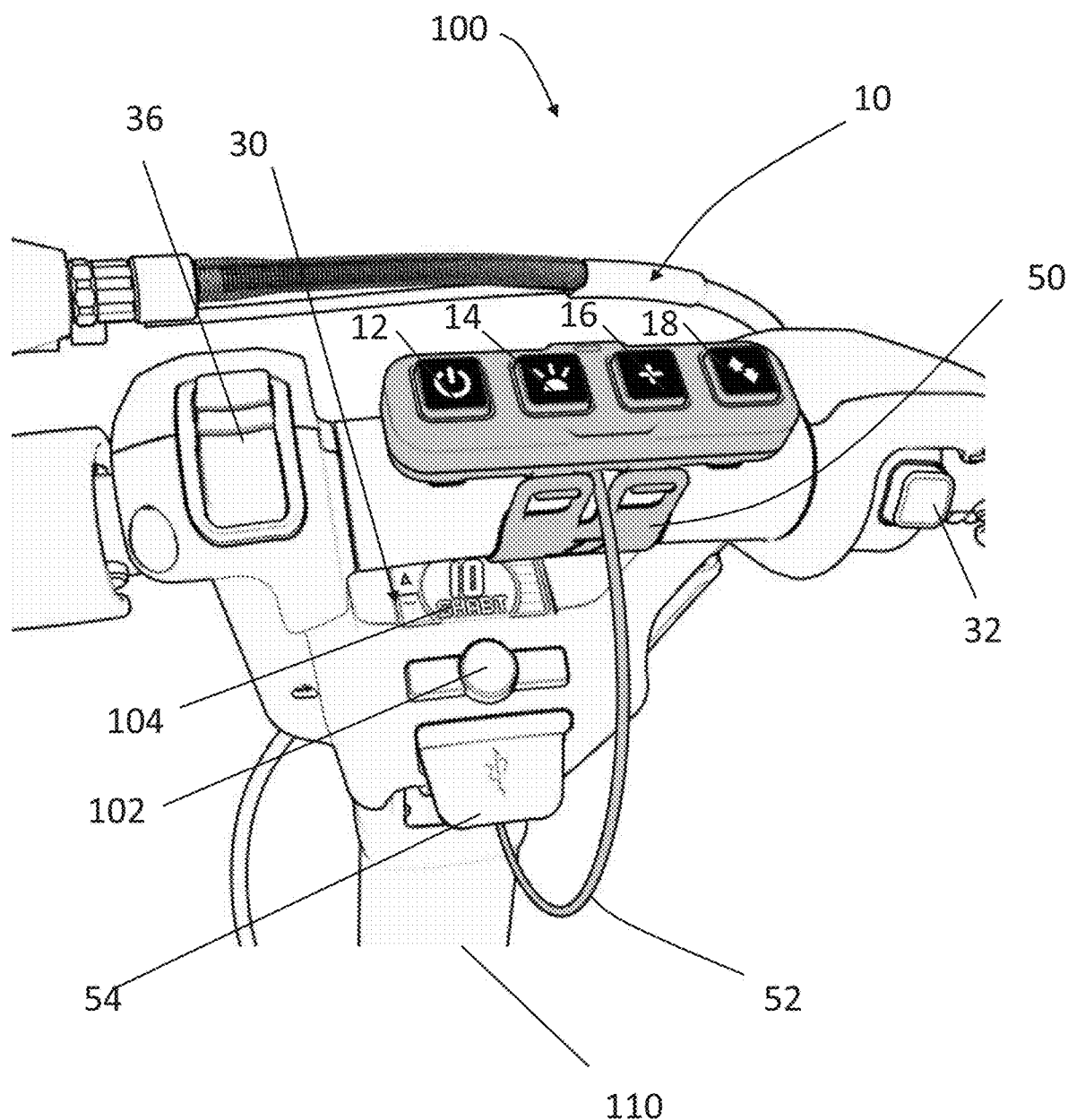
FIG. 2 is a close-up view of the mobility scooter and remote control console of FIG. 1, showing components of the remote control console, according to embodiments of the present disclosure.

FIG. 2 depicts a close-up view of the remote control console 10 and controller 30, according to embodiments of the present disclosure. Remote control console 10 includes a plurality of buttons, each of which controls a switch. Button 12 is an operation mode switch for switching between a regular operation mode and the Sabbath operation mode. While it is possible to include an operation mode switch 12 on controller 30 instead of remote control console 10, it is advantageous to include the operation mode switch 12 on the remote control console 10, for multiple reasons. First, the operation mode switch 12 does not have to take up space on any user interface of controller 30, especially during the majority of the week when Sabbath mode operation is not relevant. Second, locating the operation mode switch 12 on the remote control console 10 enables the operation mode switch 12 to be operated on the Sabbath. Thus, in the event that a user forgot to switch the mobility scooter to the Sabbath operation mode before the Sabbath, he or she is able to do so on the Sabbath. Third, locating the operation mode switch 12 on the remote control console 10 ensures that the mobility scooter 100 is switched to Sabbath operation mode only when the remote control console 10 is present.

Remote control console 10 also includes button16 for setting a speed limit of the mobility scooter 100 when in Sabbath mode. A typical maximum legal speed for mobility scooters is up to 8 miles per hour, or 10 kilometers per hour, depending on the scooter, the location, and the method of use. Using button 16, a user may set the speed limit to a desired speed limit, for example, a value between 0 and 8 miles per hour, or between 0 and 10 kilometers per hour. In an exemplary embodiment, there are a number of preset speed levels, for example ten, and depression of button 16 causes an increase in the speed level. Depression of button 16 again cycles the speed limit back to the lowest speed level.

Although in the illustrated embodiment a single button 16 is used to control the speed limit, in alternative embodiments it is possible to have two speed limit buttons, in which one speed limit button is used to increase the speed limit, and a second speed limit button is used to decrease the speed limit.

Remote control console also includes button 18 for setting a direction of movement. Button 18 is used to communicate an instruction to change a direction of movement of the mobility scooter 100, from forwards to backwards, or vice versa.

Optionally, remote control console 10 also includes a power switch 14 for one or more lights connected to mobility scooter 100. For example, mobility scooter 100 may include at least one white front light and at least one red rear light. The power switch 14 is used to communicate an instruction to turn on or off the lights.

Still referring to FIG. 2, controller 30 also includes various input buttons. Power switch 102 is used to turn the mobility scooter 100 on and off. Manual inputs 36 may include buttons for setting the speed limit of the mobility scooter 100, and a button for controlling direction of movement of the mobility scooter 100, as described above. Throttle 32 is used to deliver power to the motor or motors 120 of the mobility scooter 100. When the throttle 32 is depressed, controller 30 instructs delivery (increasing or decreasing) of sufficient power to the motor (for example, from a battery) to cause the mobility scooter to move, up to the desired speed limit. As discussed above, in the embodiments in which there are multiple motors 120, each motor may be separately controlled by its own control unit that responds to the depression of the throttle 32. Controller 30 also includes display screen 104, which displays information such as the current speed of travel of the mobility scooter. Additional manual inputs may be arranged around the display screen 104.

Power coupling port 54 is arranged on the steering column 110 of mobility scooter 100. Power cable 52 is configured to couple with the power coupling port 54. In an exemplary embodiment, power coupling port 54 is a USB port, and power cable 52 has a USB connector for coupling with the USB port 54. In an alternative embodiment, remote control console 10 has its own power source, for example, a chargeable battery. One advantage of having remote control console 10 draw power from the mobility scooter 110 is that operation of the remote control console requires constant transmission of a signal around a status change circuit, as will be discussed below, which is an energy-intensive process.

Both controller 30 and remote control console 10 include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Figure 3:
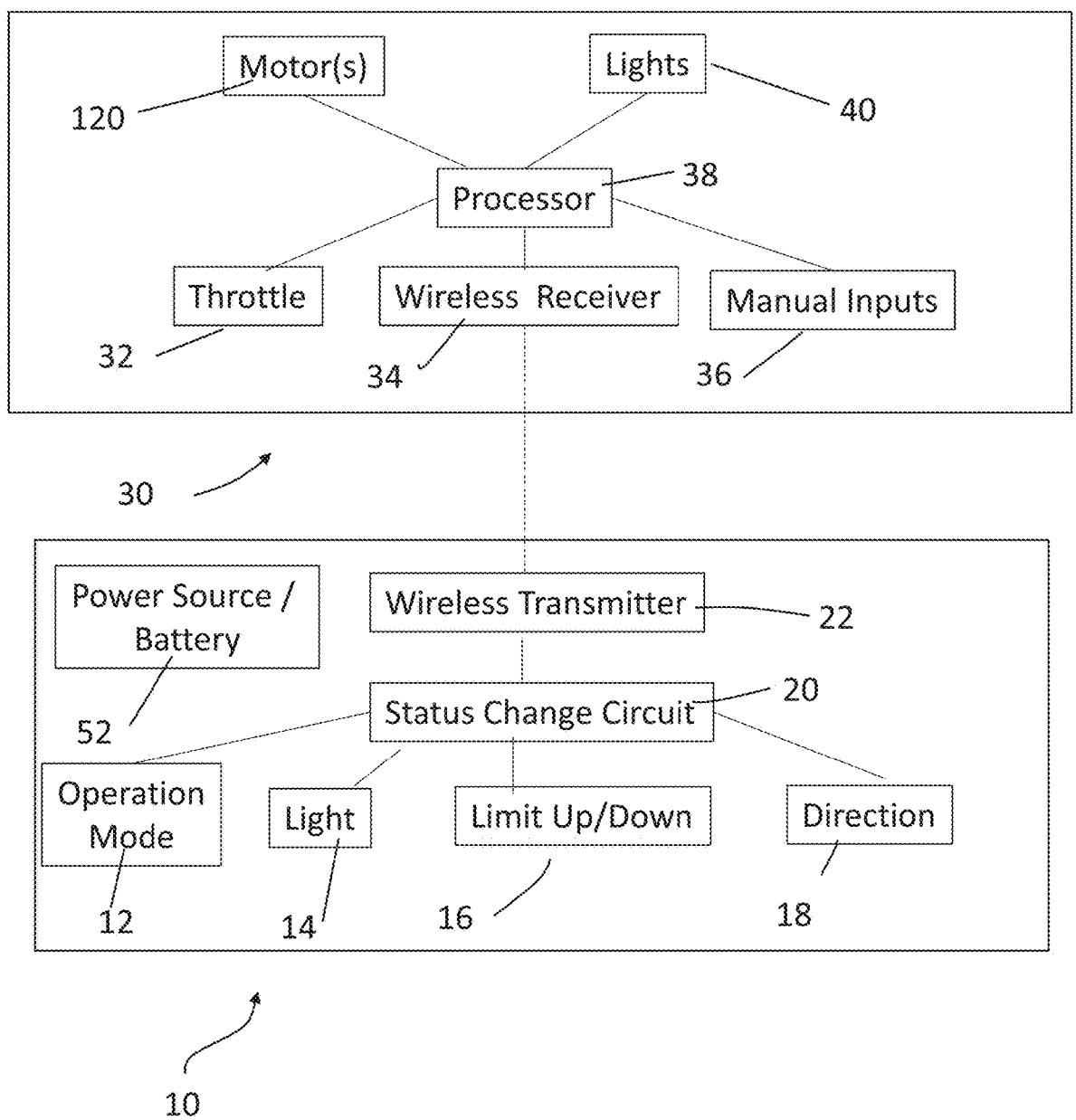
FIG. 3 is a schematic block diagram of the remote control console and the controller of the mobility scooter, according to embodiments of the present disclosure.

FIG. 3 depicts a schematic block diagram of controller 30 and remote control console 10, showing the inter-relationship of various components. Controller 30 includes a processor 38, which may be or include a computer readable storage medium, as discussed above. When the mobility scooter 100 is in regular operation mode, the processor 38 receives instructions from manual inputs 36 and throttle 32. Depending on the instructions, the processor delivers instructions to deliver power to motor or motors 120, or to lights 40. Controller 30 also includes a wireless receiver 34, for receiving instructions from wireless transmitter 24.

Remote control console 10 includes operation mode switch 12, light power switch 14, speed limit control switch 16, and direction of travel switch 18. This list of switches is merely exemplary, and switches for controlling other types of functions may also be included. Each of these switches is electrically connected to status change circuit 20. In the illustrated embodiment, each of the switches is connected to the same status change circuit 20. Alternatively, it is theoretically possible for each of the switches to be connected to its own status change circuit 20. Status change circuit 20 is operatively connected to wireless transmitter 22.

The status change circuit 20 operates using principles for status change circuits that are generally known in the art. A controller sends out a very short pulse, no longer than a few milliseconds, on a continuous, regular cycle of approximately every 3-10 seconds. The short pulse is sent on a path that includes the switches 12-20. Based on the behavior of the pulse during each cycle, the controller detects whether a given switch has changed from its previous status. Each switch is a binary switch, and may be in one of two states, which may be arbitrarily called "0" and "1". When the short pulse passes the switch in a given position, the controller is able to determine that the switch is in a particular state, for example, state "0." The status of the switch in state "0" is stored at the controller. When a user operates the switch, he or she changes the state of the switch from "0" to "1." The next time the short pulse passes the switch, the controller is able to determine that the switch is now in state "1." For the purposes of determining a change in status, it makes no difference whether the change is from state "0" to "1" or state "1" to "0."

Upon detecting the change in status of the switch, the controller instructs the wireless transmitter 22 to transmit an instruction to the wireless receiver 34. The wireless transmitter then sends a signal, for example, an RF signal, to the wireless receiver. A different signal is sent for each different switch. The processor 38 decodes the signals received by wireless receiver 34 and implements an action depending on which signal was received (for example, adjusting a speed limit, setting a direction of movement, or turning a light on or off).

The process described above may be repeated as many times as desired. For example, suppose that a user wishes to raise the speed limit by 3 mph, and each press of speed limit switch 16 causes an increase in the speed limit of 0.5 mph. The user would press the switch 16 six times, waiting approximately 10 seconds between each press, to allow for the depression of the switch 16 to be recognized and a corresponding signal to be sent via the wireless transmitter 24.

FIG. 4 depicts steps of a method of operating the mobility scooter control system. At step 201, the user turns the mobility scooter 100 on, using power switch 102 at the controller 30. Because the power switch 102 is a regular switch, in order to avoid a violation of the Sabbath, it must be turned on prior to the Sabbath. At step 202, the user connects the remote control console 10 to a power source in the mobility scooter 100, for example, by connecting power cable 52 to port 54. In the alternative, the user charges the battery of remote control console 10, to ensure that it has sufficient power to remain on for the entire Sabbath. Step 202 should also be performed before the Sabbath. It is possible to perform step 202 before step 201. Regardless, before the start of the Sabbath, the mobility scooter 100 and the remote control console 10 should both be on and connected to power.

At step 203, the user switches the mobility scooter 100 to Sabbath operation mode at the remote control console 10, for example, by depressing operation mode switch 12.

When the mobility scooter 100 is in regular operation mode, the direction of movement function and the speed limit function are responsive to instructions inputted directly to the controller 30. In the absence of instructions by a user, the controller 30 does not instruct movement of the motor 120. In other words, in regular operation mode, the motor 120 is at rest, until instructed by the user to effect a movement.

In the Sabbath operation mode, the direction of movement function and the speed limit function are responsive only to signals from the wireless transmitter 22. In the absence of instruction by the user, the controller 30 instructs the motor 120 to continuously cycle forward and backward. Thus, in Sabbath operation mode, a current is constantly flowing to the motor 120, so that operation of the mobility scooter 100 only changes the current, as opposed to creating a new current, which would violate the Sabbath. This cycling may be performed sufficiently quickly that, as soon as a wheel movement is visually perceptible, the mobility scooter 100 reverses direction. In exemplary embodiments, the mobility scooter reverses direction approximately every two seconds. The quickness of the cycling helps prevent adverse side effects on the user's comfort, for example nausea. In some implementations, the user would perceive the cyclical movement as a vibration. Advantageously, the forward and backward cycling allows this continuous current to flow, without requiring a user to compensate to prevent forward movement of the mobility scooter 100.

Notably, instructions for the continuous cycling of the motor 120 are stored on processor 38 of controller 30, rather than remote control console 10. In a preferred embodiment, this continuous cycling is implemented in the processor 38 during the initial programming of the mobility scooter control system. Because continuous cycling is not needed during regular function of a mobility scooter, a Sabbath mode console installed after completion of a mobility scooter is typically unable to introduce this functionality. This is because a Sabbath mode console typically supplies different inputs for existing command functions, as opposed to the ability to introduce new functions. By contrast, a mobility scooter control system that is initially designed to have a Sabbath mode, such as the embodiments disclosed in the present disclosure, may readily include this feature.

In addition to the above-described differences in control functions and continuous cycling, there may be other differences between regular operation mode and Sabbath operation mode. For example, in regular operation mode, screen 104 may continuously display information. This information may include direction of travel and speed of travel, and may be continuously updated. In Sabbath operation mode, the screen 104 may display a special Sabbath mode display, which may include, for example, an indication that Sabbath mode is in operation, the speed limit, the direction of travel, and the battery level of the mobility scooter 100. In addition, in Sabbath operation mode, all manual inputs 36 of controller 30 are disabled. The only button on the controller 30 that remains operational is power switch 102, which also acts as an emergency stop button.

Steps 204-207 all relate to steps of operation of the mobility scooter 100 in Sabbath mode.

At step 204, a user sets the direction of movement of the mobility scooter 100, using switch 18. At step 205, a user sets the desired speed limit with switch 16. These steps are optional, in the sense that if the mobility scooter 100 is already set to move in the desired direction and at the desired maximum speed, the user need not adjust them further. In addition, it is possible to perform these steps in any order, and at any time, while the mobility scooter 100 is in Sabbath operation mode.

At step 206, the user optionally turns off or on a light 40 of the mobility scooter 100 by depressing light power switch 14. Control of lights is typically unavailable in Sabbath mode consoles that are installed on previously completed processors. Due to technical limitations, it is typically possible only to attach such consoles to controls for the motor functions. By contrast, a mobility scooter control system that is initially designed to have a Sabbath mode, such as the embodiments disclosed in the present disclosure, may readily include control of lights.

At step 207, the user depresses the throttle 32. Depression of the throttle causes the controller 30 to deliver power to the motor or motors 120 so as to propel the mobility scooter 100, in direction of movement determined with the direction of movement function (previously set by switch 18) and at a maximum speed determined by a speed limit function (previously set by switch 16). As previously discussed, in Sabbath operation mode, depression of throttle 32 causes a change in an existing current rather than creation of new current. The throttle 32 is used for both accelerating and braking, with different positions of the throttle causing different outcomes.

It is expected that during the life of a patent maturing from this application many switches, circuits, and communication protocols will be developed that are suitable for the functions described herein, and the scope of the terms switch, circuit, and communication protocol is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A mobility scooter control system, comprising:
a remote control console comprising a wireless transmitter and a plurality of switches, and at least one status detection circuit integrated with each of the switches, wherein the at least one status detection circuit is configured to emit a pulse on a continuous, regular cycle, and processing circuitry configured to detect a change in state of each switch, such that, after the pulse passes the respective switch following a change in state of the switch, a wireless transmission is sent; and
at least one controller electronically connected to at least one motor of a mobility scooter, and having:
a regular operation mode in which a direction of movement function and a speed limit function are responsive to instructions inputted directly to the at least one controller, and, in the absence of instruction by a user, the at least one controller does not instruct movement of the at least one motor;
and a Sabbath operation mode in which the direction of movement function and the speed limit function are responsive only to signals from the wireless transmitter, and, in the absence of instruction by the user, the at least one controller instructs the at least one motor to continuously cycle forward and backward.

2. The mobility scooter control system of claim 1, wherein, in the Sabbath operation mode, the at least one controller instructs the at least one motor to cycle between forward and backward movement following each visually perceptible movement of wheels of the mobility scooter.

3. The mobility scooter control system of claim 1, wherein the at least one controller comprises a throttle, and wherein, upon depression of the throttle in the Sabbath operation mode, the at least one controller causes increase or decrease of delivery of power to the at least one motor so as to propel the mobility scooter, said propelling in a direction of movement determined with the direction of movement function and at a maximum speed determined by the speed limit function.

4. The mobility scooter control system of claim 1, wherein at least one of: the mobility scooter further comprises a power coupling port, and the remote control console further comprises a power cable configured to connect to the power coupling port and thereby deliver power to the remote control console; and the remote control console comprises a chargeable battery.

5. The mobility scooter control system of claim 1, further comprising a strap for releasably attaching the remote control console to the mobility scooter.

6. The mobility scooter control system of claim 1, wherein the plurality of switches comprise an operation mode switch for switching between the regular operation mode and the Sabbath operation mode, a switch for increasing and decreasing the speed limit, and a switch for changing direction of movement between forwards and backwards.

7. The mobility scooter control system of claim 1, wherein the mobility scooter further comprises at least one light, and the plurality of switches comprises a power switch for the at least one light.

8. A method of operating a mobility scooter control system, wherein the control system comprises a remote control console comprising a wireless transmitter and a plurality of switches, and at least one status detection circuit integrated with each of the switches, wherein the at least one status detection circuit is configured to emit a pulse on a continuous, regular cycle, and processing circuitry configured to detect a change in state of each switch, such that, after the pulse passes the respective switch following a change in state of the switch, a wireless transmission is sent; and at least one controller electronically connected to at least one motor of a mobility scooter and having a regular operation mode in which a direction of movement function and a speed limit function are responsive to instructions inputted directly to the controller, and, in the absence of instruction by a user, the at least one controller does not instruct movement of the at least one motor, and a Sabbath operation mode in which the direction of movement function and the speed limit function are responsive only to signals from the wireless transmitter, and, in the absence of instruction by the user, the at least one controller instructs the at least one motor to continuously cycle forward and backward, the method comprising:
switching the mobility scooter control system between the regular operation mode and the Sabbath operation mode.

9. The method of claim 8, wherein, in the Sabbath operation mode, the at least one controller instructs the at least one motor to cycle between forward and backward movement following each visually perceptible movement of wheels of the mobility scooter.

10. The method of claim 8, wherein the controller further comprises a throttle, and the method further comprises depressing the throttle when the mobility scooter is in the Sabbath operation mode, wherein, upon said depression of the throttle, the at least one controller causes delivery of increased or decreased power to the at least one motor so as to propel the mobility scooter, said propelling in a direction of movement determined with the direction of movement function and at a maximum speed determined by the speed limit function.

11. The method of claim 8, further comprising, prior to the switching step, at least one of: connecting a power cable of the remote control console to a power coupling port in the mobility scooter; and charging a battery of the remote control console.

12. The method of claim 8, further comprising strapping the remote control console to the mobility scooter.

13. The method of claim 8, wherein one of the plurality of switches is an operation mode switch, and the switching step comprises depressing the operation mode switch.

14. The method of claim 8, wherein the plurality of switches comprises a switch for increasing and decreasing the speed limit, a switch for decreasing the speed limit, and a switch for changing direction of movement between forwards and backwards, and the method further comprises performing the following steps when the mobility scooter is in the Sabbath operation mode:
setting the speed limit with the switch for increasing and decreasing the speed limit;
setting the direction of movement with the switch for changing direction of movement.

15. The method of claim 8, wherein the mobility scooter comprises at least one light, the plurality of switches comprises a power switch for the at least one light, and the method comprises at least one of turning on and turning off the light while in Sabbath operation mode by depressing the power switch.

16. A remote control console for a mobility scooter, comprising:
- a wireless transmitter and a plurality of switches, and at least one status detection circuit integrated with each of the switches, wherein the at least one status detection circuit is configured to emit a pulse on a continuous, regular cycle, and processing circuitry configured to detect a change in state of each switch, such that, after the pulse passes the respective switch following a change in state of the switch, a wireless transmission is sent;
- wherein different signals from the wireless transmitter are configured to control a direction of movement function of a motor of a mobility scooter, and a speed limit function of the motor, and whether the mobility scooter implements commands from the remote control console.

* * * * *